(12) United States Patent
Takagi et al.

(10) Patent No.: US 8,860,710 B2
(45) Date of Patent: Oct. 14, 2014

(54) DISPLAY APPARATUS AND DRIVE METHOD

(75) Inventors: Ayako Takagi, Yokosuka (JP); Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 190 days.

(21) Appl. No.: 13/603,640

(22) Filed: Sep. 5, 2012

(65) Prior Publication Data
US 2012/0327068 A1 Dec. 27, 2012

Related U.S. Application Data

(63) Continuation of application No. PCT/JP2010/002018, filed on Mar. 23, 2010.

(51) Int. Cl.
| | |
|---|---|
| G09G 5/00 | (2006.01) |
| G09G 3/00 | (2006.01) |
| H04N 13/04 | (2006.01) |
| G02B 27/22 | (2006.01) |
| G02F 1/1347 | (2006.01) |
| G09G 3/36 | (2006.01) |

(52) U.S. Cl.
CPC .......... *G02B 27/2214* (2013.01); *G09G 3/3696* (2013.01); *G09G 3/003* (2013.01); *H04N 13/0454* (2013.01); *G09G 3/3607* (2013.01); *H04N 13/0404* (2013.01); *G09G 3/3648* (2013.01); *H04N 13/0456* (2013.01); *G09G 3/3614* (2013.01); *G02F 1/1347* (2013.01)
USPC ................................ 345/212; 345/87; 348/51

(58) Field of Classification Search
None
See application file for complete search history.

(56) References Cited

U.S. PATENT DOCUMENTS

| | | | |
|---|---|---|---|
| 8,531,439 B2 * | 9/2013 | Ijzerman et al. | ............... 345/204 |
| 2009/0046143 A1 | 2/2009 | Hiddink et al. | |
| 2010/0073347 A1 | 3/2010 | Takagi et al. | |

FOREIGN PATENT DOCUMENTS

| | | |
|---|---|---|
| JP | 2009-519488 | 5/2009 |
| JP | 2010-60773 | 3/2010 |
| WO | WO 2007/069131 A2 | 6/2007 |

OTHER PUBLICATIONS

Notification of Reason for Rejection issued by the Japanese Patent Office on Aug. 13, 2013, for Japanese Patent Application No. 2012-506656, and English-language translation thereof.
International Search Report from Japanese Patent Office for International Application No. PCT/JP2010/002018, Mailed Jul. 6, 2010.

* cited by examiner

*Primary Examiner* — Jason Olson
(74) *Attorney, Agent, or Firm* — Finnegan, Henderson, Farabow, Garrett & Dunner, L.L.P.

(57) ABSTRACT

If areas corresponding to the address electrodes in the second row have an area to be stereoscopic display and an area not to be stereoscopic display and an area of the connecting wire of the far electrode corresponding to the area to be stereoscopic display in the second column is included in the area not to be stereoscopic display in the first column, then a third address voltage obtained by inverting the first address voltage in positive-negative polarity is applied to the address electrodes in the second row, a third column voltage obtained by inverting the first column voltage in positive-negative polarity is applied to the far electrode corresponding to the area to be stereoscopic display, and a fourth column voltage obtained by inverting the second column voltage in positive-negative polarity is applied to the far electrode corresponding to the area not to be stereoscopic display.

15 Claims, 9 Drawing Sheets

| VOLTAGE WAVEFORM |||||||| DISPLAY MODE |||| VOLTAGE [V] |
|---|---|---|---|---|---|---|---|---|---|---|---|---|
| A (ADDRESS) | A (COLUMN) | B (ADDRESS) | B (COLUMN) | C (ADDRESS) | C (COLUMN) | D (ADDRESS) | D (COLUMN) | A | B | C | D | |
| ON(1) | ON(-1) | | | | | | | 3D | | | | 4.5 |
| ON(1) | OFF(1) | | | | | | | 2D | | | | 1.5 |
| OFF(0) | ON(-1) | | | | | | | 2D | | | | 1.5 |
| OFF(0) | OFF(1) | | | | | | | 2D | | | | 1.5 |
| | | ON(1) | ON(-1) | | | | | | 3D | | | 4.5 |
| | | ON(1) | OFF(1) | | | | | | 2D | | | 1.5 |
| | | OFF(0) | ON(-1) | | | | | | 2D | | | 1.5 |
| | | OFF(0) | OFF(1) | | | | | | 2D | | | 1.5 |
| | | | | ON(1) | ON(-1) | | | | | 3D | | 4.5 |
| | | | | ON(1) | OFF(1) | | | | | 2D | | 1.5 |
| | | | | OFF(0) | ON(-1) | | | | | 2D | | 1.5 |
| | | | | OFF(0) | OFF(1) | | | | | 2D | | 1.5 |
| | | | | | | ON(1) | ON(-1) | | | | 3D | 4.5 |
| | | | | | | ON(1) | OFF(1) | | | | 2D | 1.5 |
| | | | | | | OFF(0) | ON(-1) | | | | 2D | 1.5 |
| | | | | | | OFF(0) | OFF(1) | | | | 2D | 1.5 |

| VOLTAGE WAVEFORM ||||||||| DISPLAY MODE |||| VOLTAGE [V] |
|---|---|---|---|---|---|---|---|---|---|---|---|---|
| A (ADDRESS) | A (COLUMN) | B (ADDRESS) | B (COLUMN) | C (ADDRESS) | C (COLUMN) | D (ADDRESS) | D (COLUMN) | A | B | C | D | |
| ON(1) | ON(-1) | | | | | | | 3D | | | | 4.5 |
| ON(1) | OFF(1) | | | | | | | 2D | | | | 1.5 |
| OFF(0) | ON(-1) | | | | | | | 2D | | | | 1.5 |
| OFF(0) | OFF(1) | | | | | | | 2D | | | | 1.5 |
| | | ON(-1) | ON(1) | | | | | | 3D | | | 4.5 |
| | | ON(-1) | OFF(-1) | | | | | | 2D | | | 1.5 |
| | | OFF(0) | ON(1) | | | | | | 2D | | | 1.5 |
| | | OFF(0) | OFF(-1) | | | | | | 2D | | | 1.5 |
| | | | | ON(1) | ON(-1) | | | | | 3D | | 4.5 |
| | | | | ON(1) | OFF(1) | | | | | 2D | | 1.5 |
| | | | | OFF(0) | ON(-1) | | | | | 2D | | 1.5 |
| | | | | OFF(0) | OFF(1) | | | | | 2D | | 1.5 |
| | | | | | | ON(1) | ON(1) | | | | 3D | 4.5 |
| | | | | | | ON(1) | OFF(-1) | | | | 2D | 1.5 |
| | | | | | | OFF(0) | ON(1) | | | | 2D | 1.5 |
| | | | | | | OFF(0) | OFF(-1) | | | | 2D | 1.5 |

FIG. 19

DISPLAY APPARATUS AND DRIVE METHOD

CROSS-REFERENCE TO RELATED APPLICATION

This application is a continuation of and claims the benefit of prior International Application No. PCT/JP 2010/002018 filed on Mar. 23, 2010, the entire contents of which are incorporated herein by reference.

FIELD

Embodiments described herein relate generally to a display device and its drive method.

BACKGROUND

In recent years, development of the stereoscopic display apparatus without glasses has been promoted. Many of them use a scheme in which some optical plate is placed in front of, or behind a two-dimensional display device. There is a three-dimensional image display method called II (Integral Imaging) scheme. In the II scheme, a different image can be viewed according to the position of the viewer or the angle at which the viewer views.

A function capable of changing over between a two-dimensional image and a stereoscopic image and displaying a resultant image in the same display apparatus is desired. Therefore, a display apparatus capable of changing over between 2D(two-dimensional)/3D(three-dimensional) display by using a voltage between an array of row electrode lines and an array of column electrodes is proposed. According to the proposed display apparatus, the 2D/3D display is changed over by combinations of three voltages applied to the array of row electrode lines and the array of column electrode lines.

BRIEF DESCRIPTION OF THE DRAWINGS

FIGS. 8(a1) to 8(b3) are diagrams showing combinations of an address signal and a column signal, and a voltage applied to liquid crystal actually;

DETAILED DESCRIPTION

A display apparatus according to an embodiment includes: a display device; a switching unit provided opposed to the display device and configured to control a polarization direction of a light ray illuminated from the display device, the switching unit comprising: a first substrate having a plurality of address electrodes arranged in a first direction, each address electrode classified into a first row or a second row in accordance with a distance from a first side parallel to the first direction, a second substrate having a plurality of column electrodes arranged in a second direction nearly perpendicular to the first direction, each column electrode having a connecting wire extending to a first side and classified into a near electrode or a far electrode in accordance with a distance from the first side, liquid crystal interposed between the first substrate and the second substrate; and a control unit configured to supply voltage between the address electrode and the column electrode, (a) if a first area corresponding to the first row includes a 3D mode area, the control unit applying a first address voltage to the address electrode in the first row, and applying a first column voltage to the near electrode in the 3D mode area, and (b) if a second area corresponding to the address electrode in the second row includes the 3D mode area and a third area included in the first area corresponding to the connecting wire includes the 2D mode area, the control unit applying a third address voltage inverse of the first address to the address electrode in the second row, and applying a third column voltage inverse of the first column voltage to the far electrode in the 3D mode area.

Hereafter, embodiments will be described in detail. Incidentally, configurations and processing conducting operations which are similar to each other are denoted by a common character and duplicated description will be omitted.

(First Embodiment)

Figure 1:
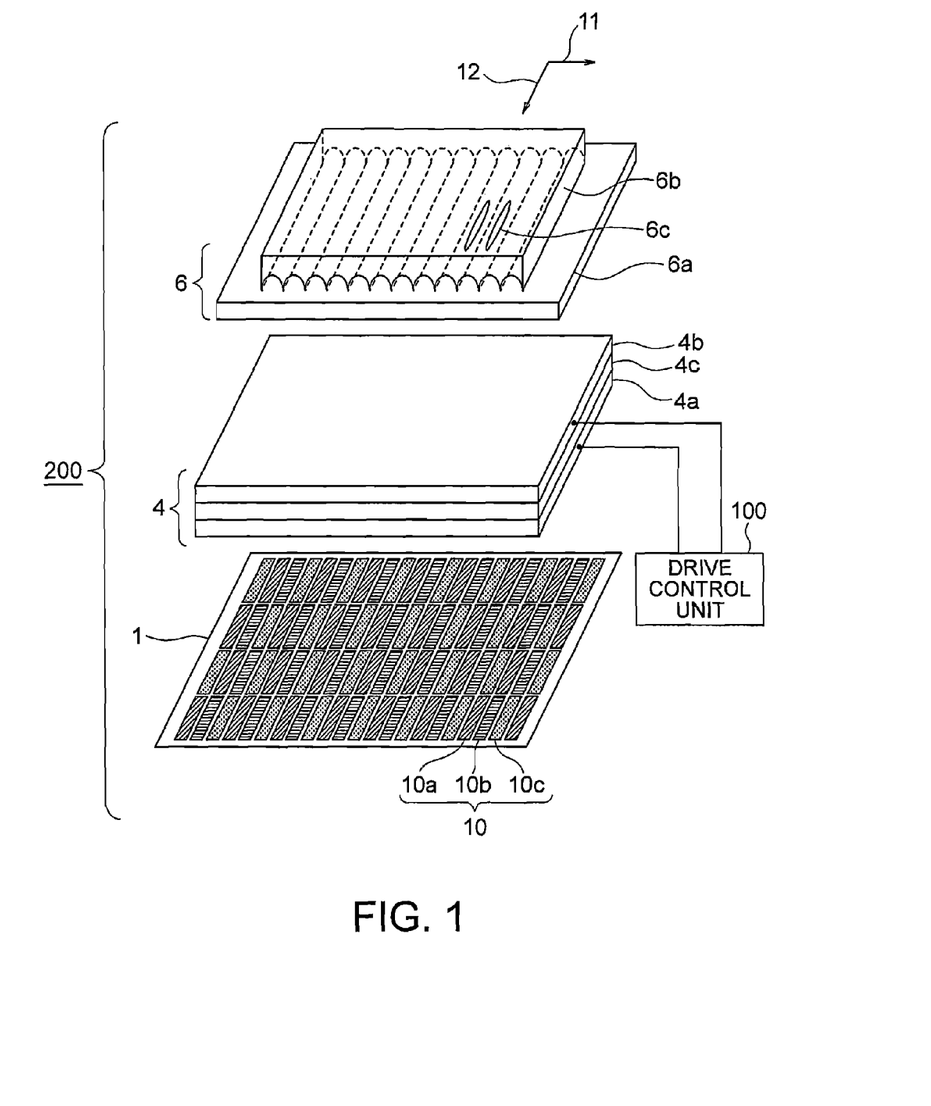
FIG. 1 is a diagram showing a stereoscopic display apparatus according to a first embodiment.

FIG. 1 is a diagram showing a stereoscopic display apparatus driven by using a drive method according to the present embodiment. The stereoscopic display apparatus includes, for example, a plane display device 1 which is a liquid crystal display device, a polarization switching cell 4 provided in front of the plane display device 1, and an optical plate 6 provided on an opposite side of the polarization switching cell 4 from the plane display device 1.

The plane display device 1 has a display face composed of pixels 10 having sub-pixels 10a, 10b and 10c respectively of R (red), G (green) and B (blue) arranged in a matrix form. The polarization switching cell 4 is provided in front of the display face. The polarization switching cell 4 has transparent electrode substrates 4a and 4b opposed to each other, and liquid crystal 4c is interposed between these electrode substrates 4a and 4b. As for the liquid crystal 4c, for example, TN (Twisted Nematic) liquid crystal can be used. The polarization direction of light illuminated from pixels of the plane display device 1 is controlled by changing a voltage applied between these electrode substrates 4a and 4b.

The optical plate 6 includes a flat transparent substrate 6a on the polarization switching cell 4 side, a lens substrate 6b which covers the transparent substrate 6a and in which a plurality of cylindrical shaped lenses having a major axis nearly parallel to a longitudinal arrangement direction of the pixels 10 of the plane display device 1 are arranged in parallel, and double refraction substances 6c stored in areas surrounded by the substrate 6a and the lens substrate 6b. The substrate 6a and the lens substrate 6b serve as molding boxes of lenses, and the insides of the molding boxes are filled with the double refraction substances 6c. A major axis direction of the double refraction substances 6c is nearly parallel to the major axis direction of each lens of the lens substrate 6b, and a minor axis direction of the double refraction substances 6c is nearly perpendicular to the major axis direction of each lens of the lens substrate 6b. A refractive index in the major axis direction of the double refraction substances 6c is greater than that in the minor axis direction. Furthermore, the lens molding boxes 6a and 6b have an isotropic refractive index, and it is set to become nearly equal to the refractive index in the minor axis direction of the double refraction substances 6c. The optical plate 6 distributes light rays from pixels on the plane display device 1, to predetermined angles. The optical plate shown in FIG. 1 need only be a lens capable of changing over between 2D/3D according to the polarization direction, and a graded index parallel plate lens is also included.

The polarization switching cell 4 uses TN liquid crystal as the liquid crystal 4c. If a saturation voltage Von is applied between the electrode substrates 4a and 4b, then the polarization direction of light is not rotated and a three-dimensional image display mode is brought about. If a voltage Voff is applied between the electrode substrates 4a and 4b, then the polarization direction of light is rotated by 90 degrees and a two-dimensional image display mode is brought about.

In the two-dimensional image display mode, the polarization direction (a direction of an arrow 11) is adjusted by the polarization switching cell 4 to coincide with the minor axis direction of the double refraction substances 6c interposed between the substrate 6a and the lens substrate 6b. And the refractive index of the lens molding boxes 6a and 6b is isotropic and is set to become nearly equal to the refractive index in the minor axis direction of the double refraction substances 6c. As a result, light is not bent at an interface between the polarization switching cell 4 and the optical plate 6. A high definition two-dimensional image on the flat display device 1 located behind the interface can be viewed as it is.

On the other hand, in the three-dimensional image display mode, the polarization direction (a direction of an arrow 12) is adjusted by the polarization switching cell 4 to coincide with the major axis direction of the double refraction substances 6c. And the refractive index of the double refraction substances 6c is higher than that of the lens molding boxes 6a and 6b. Therefore, light is refracted at the interface between the polarization switching cell 4 and the optical plate 6, and a lens effect appears. As a result, light from each pixel of the plane display device 1 is expanded to the whole lens face in a direction depending upon its position and illuminated. Accordingly, a three-dimensional image having a directive property can be viewed.

Changeover between the two-dimensional image and the three-dimensional image can be conducted every area of the display face by using the stereoscopic display apparatus shown in FIG. 1. Hereafter, a method for conducting changeover between the two-dimensional image and the three-dimensional image partially will be described.

Figure 2:
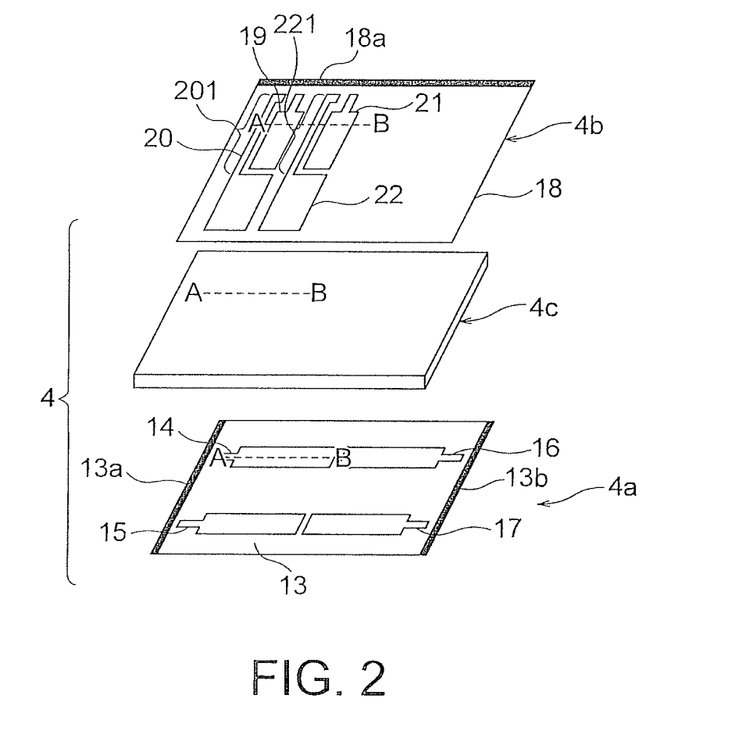
FIG. 2 is a diagram showing an example of a polarization switching cell.

FIG. 2 is a diagram showing an example of the polarization switching cell 4. The polarization switching cell 4 has transparent electrode substrates 4a and 4b opposed to each other, and liquid crystal 4c is interposed between the electrode substrates 4a and 4b. Incidentally, if electrodes are taken out from directions of four sides, then a narrow frame is not formed, but an inlet and an interconnection takeout port overlap. Therefore, it is desirable to take out external electrodes from three directions.

The electrode substrate 4a has four transparent address electrodes 14, 15, 16 and 17 disposed in parallel on a glass substrate 13. As for the address electrodes, two electrodes are disposed in parallel directions on the glass substrate 13 (for example, the address electrodes 14 and 15, or the address electrodes 16 and 17). Two sides 13a and 13b on the glass substrate 13 which are nearly perpendicular to the direction in which the address electrodes 14, 15, 16 and 17 are disposed are sides close to external connection electrodes (not illustrated) which supply power to the address electrodes 14, 15, 16 and 17. The address electrodes 14 and 15 are supplied with power from the side 13a side, whereas the address electrodes 16 and 17 are supplied with power from the side 13b side. The address electrodes 14 and 16 are included in a first row disposed near a side 18a. The address electrodes 15 and 17 are included in a second row disposed relatively farther from the side 18a than the first row. The address electrodes 14, 15, 16 and 17 are disposed to make the first row and the second row nearly parallel to each other. Potentials applied to the address electrodes 14, 15, 16 and 17 can be controlled respectively individually.

The electrode substrate 4b has column electrodes 19, 20, 21 and 22 disposed on a glass substrate 18 in a direction nearly perpendicular to the direction in which the address electrodes 14, 15, 16 and 17 are disposed. One side 18a of the substrate 18 in a direction nearly perpendicular to the direction in which the column electrodes 19, 20, 21 and 22 are disposed is a side near an external connection electrode (not illustrated). The column electrodes 19, 20, 21 and 22 are supplied with power from the side 18a side. Hereafter, the column electrodes 20 and 22 disposed far from the side 18a are described as far electrodes in some cases. Hereafter, the column electrodes 19 and 21 disposed near the side 18a are described as near electrodes in some cases. The column electrodes 20 and 22 have connecting wires 201 and 221 for obtaining voltages, respectively. In the example shown in FIG. 2, the number of column electrodes is four. However, the number of column electrodes is not restricted to four, but the number may be arbitrary. Potentials applied to the column electrodes 19, 20, 21 and 22 can be controlled respectively individually.

Figure 3:
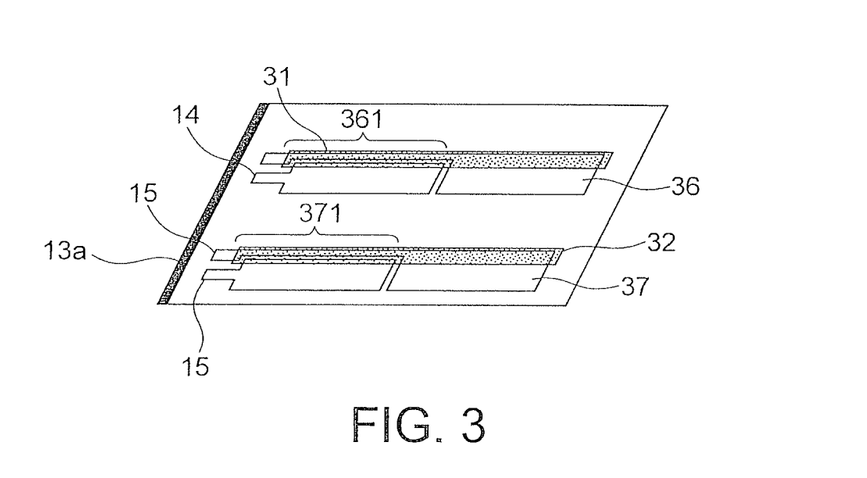
FIG. 3 is a diagram showing an example of an electrode substrate having address electrodes disposed thereon.

FIG. 3 is a diagram showing another example of the electrode substrate 4a. The electrode substrate 4a has address electrodes 14, 15, 36 and 37. The address electrodes 14, 15, 36 and 37 are supplied with power from one side 13a of the electrode substrate 4a. The address electrodes 36 and 37 have connecting wires 361 and 371 for obtaining voltages, respectively. There is a fear that a potential difference will be caused between areas of the connecting wires 361 and 371 and the address electrodes 14 and 15 and display degradation will occur. In order to prevent the display degradation, black matrixes 31 and 32 are disposed on the connecting wires 361 and 371. At this time, the disposition direction of the black matrixes is made perpendicular to a lens ridge line. The reason will now be described. If the black matrixes are placed in a direction which is horizontal to the lens ridge line, then light is expanded to the lens width even when the position of the black matrixes is at a lens end. Therefore, there is a possibility that moiré having repetition of a dark area and a bright area over the whole screen will occur. That is the reason. Even when a low resistance part is generated by, for example, engagement with dust or the like between the address electrodes and the column electrodes, divided lines and divided address areas in which a fault occurs can be made small by dividing the electrodes.

Figure 4:
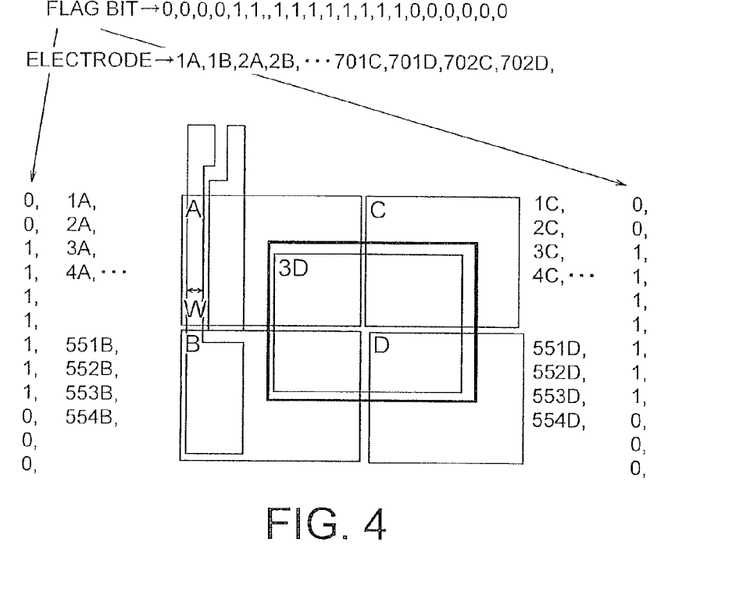
FIG. 4 is a diagram showing flag bit drive electrodes.

FIG. 4 is a diagram showing flag bit drive electrodes. Interconnections for applying interlayer voltages over the whole face of the polarization switching cell are bisected for both the address electrodes and the column electrodes, and divided into A, B, C and D areas. By dividing the interconnections into the A, B, C and D areas, they can be controlled independently of each other. As shown in FIG. 4, therefore, one 3D window can be displayed by setting windows located at corners of the A, B, C and D areas to 3D display. Or a total of four 3D windows can also be displayed by providing one 3D window in each of the A, B, C and D areas.

A display apparatus according to the present embodiment includes a stereoscopic display apparatus 200 and a drive control unit 100. The stereoscopic display apparatus 200 is the stereoscopic display apparatus shown in FIG. 1.

If there is an area to be subject to stereoscopic display, in areas corresponding to the address electrodes 14 and 16, then the drive control unit 100 applies a first address voltage to the address electrodes 14 and 16. Incidentally, if there is an area to be subject to stereoscopic display, only in an area corresponding to either the address electrode 14 or 16, then the drive control unit 100 applies the first address voltage to an address electrode corresponding to that area. The drive control unit 100 applies a first column voltage to a column electrode corresponding to an area to be subject to stereoscopic display out of the column electrodes (near electrodes) 19 and 21 corresponding to the first column. The drive control unit 100 applies a second column voltage to column electrodes corresponding to areas which should not be subject to stereoscopic display.

If there is not an area to be subject to stereoscopic display, in areas corresponding to the address electrodes 14 and 16, then the drive control unit 100 applies a second address voltage to the address electrodes 14 and 16. Incidentally, if there is not an area to be subject to stereoscopic display, only in an area corresponding to either the address electrode 14 or 16, then the drive control unit 100 applies the second address voltage to an address electrode corresponding to that area.

If areas corresponding to the address electrodes 15 and 17 include an area to be subject to stereoscopic display and an area which should not be subject to stereoscopic display and any of areas of the connecting wires 201 and 221 corresponding to the area which should not be subject to stereoscopic display crosses an area in the first row to be subject to stereoscopic display, then a third address voltage obtained by inverting the first address voltage in a positive-negative polarity is applied to the address electrodes 15 and 17 in the second row. For example, a case where the column electrodes 19 and 21 conduct plane display and the column electrode 22 conducts stereoscopic display can be mentioned. Furthermore, a third column voltage obtained by inverting the first column voltage in the positive-negative polarity is applied to an electrode corresponding to an area to be subject to stereoscopic display, out of the column electrodes 20 and 22, and a fourth column voltage obtained by inverting the second column voltage in the positive-negative polarity is applied to an electrode corresponding to an area which should not be subject to stereoscopic display.

Figure 5:
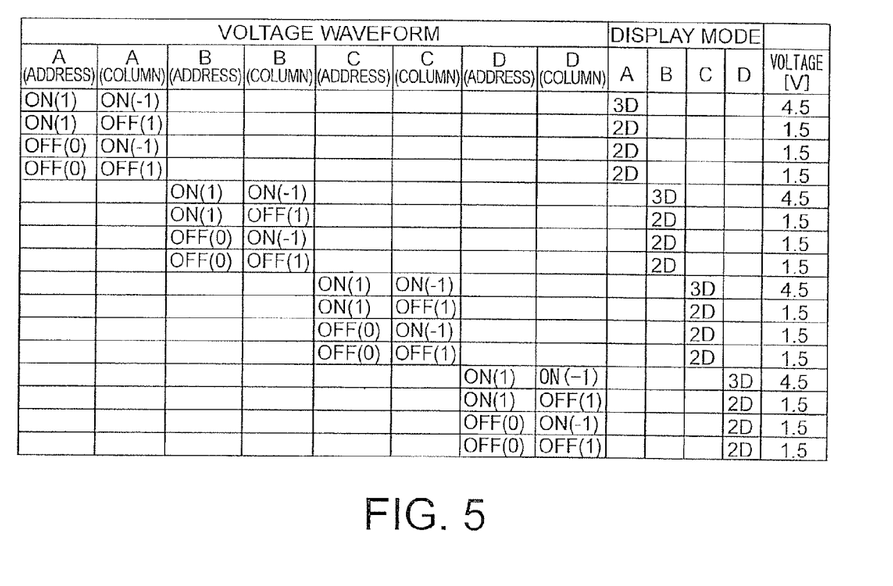
FIG. 5 is a diagram for explaining typical simple matrix drive.

FIG. 5 is a diagram for explaining typical simple matrix drive using TN liquid crystal. Supposing that the number of lines (scanning lines) Y1 to Yn in the vertical direction is n, one frame is divided by the number n of lines and a pulse having an address waveform for selecting a signal waveform is generated line after line. During a pulse interval on a selected address line, a great voltage is applied to liquid crystal by supplying a pulse voltage in a polarity opposite to that of a pulse voltage on the address line in the case of a selected pixel, resulting in ON display. In the case of an unselected pixel, a small voltage is applied to liquid crystal by supplying a pulse voltage in a polarity which is the same as that of the pulse voltage on the address line, resulting in OFF display. Furthermore, since the electro-optic effect of TN-type liquid crystal is accumulation response type, its transmittance depends upon the effective value of the applied voltage. In simple matrix drive, therefore, liquid is brought into the non-display state by causing an average in one frame to become a threshold voltage or less instead of causing the column voltage applied to columns (signal lines) X1 to Xm to become 0 V at the time of OFF as well. And an important point of the simple matrix drive technique is to cause a voltage of at least Vsat in which the rising direction of liquid crystal exists at least 95% in polarization selection ratio as the ON voltage, under the condition that the average voltage at the time of OFF is made the threshold voltage or less.

In the stereoscopic display apparatus according to the present embodiment, flag bit drive is conducted. In the conventional simple matrix drive, N kinds of waveforms are needed, where N is the number of address lines, and Von/Voff becomes close to 1. In the case of the 2D display mode, therefore, the lens effect remains in some cases. In the flag bit drive, an ON voltage waveform which is common to interconnections having windows is applied to address electrodes and column electrodes in a part of 3D window areas. An OFF voltage waveform is applied to other electrodes. As shown in FIG. 5, therefore, drive can be conducted with waveforms of two kinds and Von/Voff can be made nearly equal to 3. As a result, occurrence of the lens effect can be prevented at the time of the 2D display mode. 3D display which is lower in cost, less in moiré, and less in luminance lowering than active matrix drive using transistors with metal interconnections can be implemented by conducting flag bit drive using only ITO interconnections on electrodes which exercises control in the polarization direction.

Figure 6:
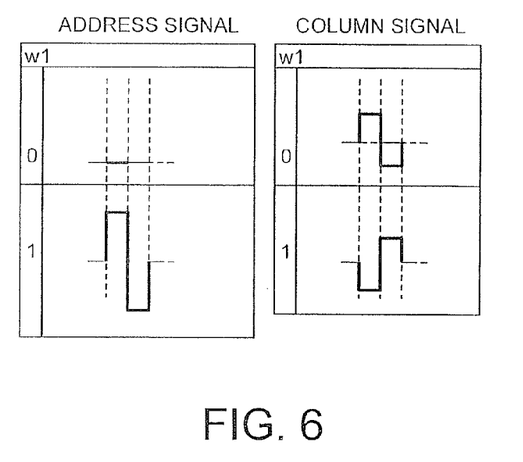
FIG. 6 is a diagram showing voltage waveforms of address signals and column signals and display modes.

FIG. 6 shows voltage waveforms of address signals and column signals and display modes. It is supposed that V0 is a voltage lower than a threshold voltage of TN liquid crystal, an ON voltage of the column voltage is −V0(−1), and an OFF voltage of the column voltage is V0(1). It is supposed that an ON voltage of the address voltage is 2×V0 and an OFF voltage of the address voltage is 0. By doing so, the 3D display mode is brought about when both the address voltage and the column voltage are the ON voltage in a combination of them, and consequently window display becomes possible. If the address electrodes are at VOFF, then a voltage applied to the column electrode is the ON voltage and VOFF is equal to or less than a threshold voltage at which the liquid crystal rises. Therefore, the polarization direction of the TN liquid crystal is rotated by 90 degrees, resulting in the 2D display mode.

As shown in FIG. 6, in the address signal in the first row, a flag of w1 becomes "1" when there is a 3D window in its horizontal line, whereas the flag becomes "0" when there is not a 3D window. In the column signal as well, a flag of w1 becomes "1" when there is a 3D window in its vertical line, whereas the flag becomes "0" when there is not a 3D window.

Figure 7:
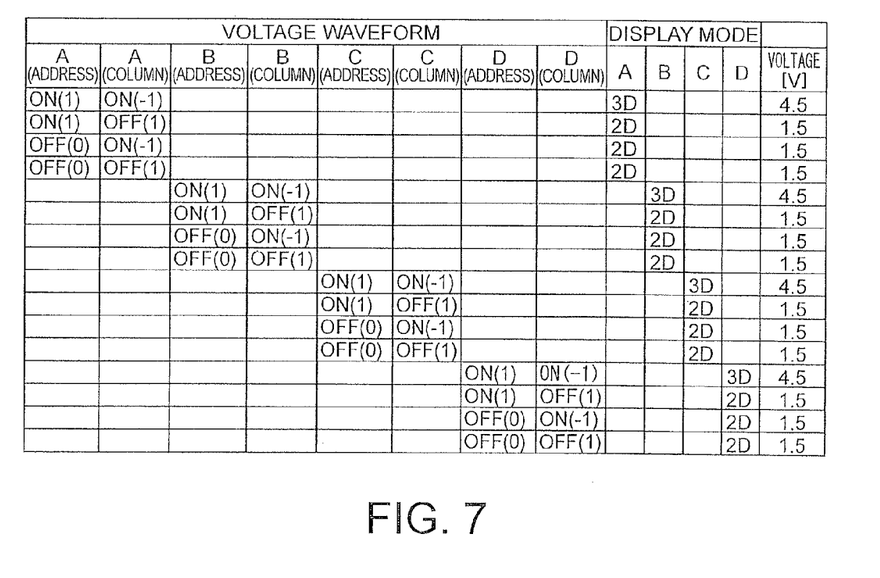
FIG. 7 is a diagram showing relations between combinations of address signals and column signals, and display modes.

FIG. 7 is a diagram showing relations between combinations of address signals and column signals, and display modes, in the drive method according to the present embodiment. If the voltage applied to the column electrode is set to the ON voltage (−1.5 V) when the address electrode is at the ON voltage (3 V), then the voltage applied across the liquid crystal becomes 4.5 V, resulting in stereoscopic display. If the voltage applied to the column electrode is set to the OFF voltage (1.5 V) when the address electrode is at the ON voltage (3 V), then the voltage applied across the liquid crystal becomes 1.5 V, resulting in plane display. When the address voltage is at the OFF voltage (0 V), the voltage applied across the liquid crystal becomes 1.5 V and plane display is brought about no matter whether the voltage applied to the column electrode is ON voltage (−1.5 V) or OFF voltage (1.5 V).

Figure 8:
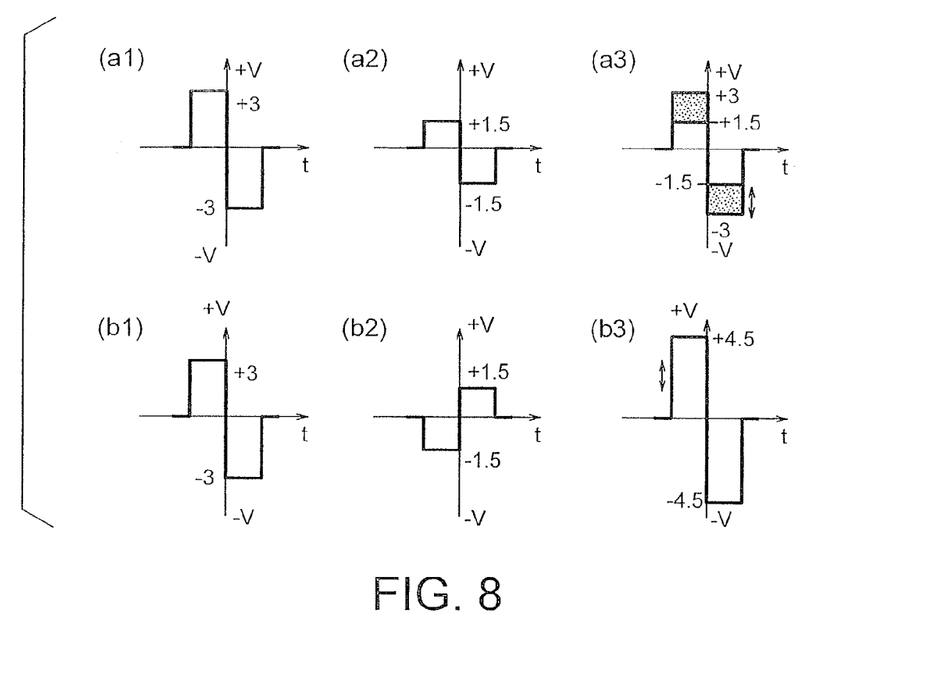

FIGS. 8(a1) to 8(b3) are diagrams showing combinations of an address signal and a column signal, and a voltage applied to liquid crystal actually. FIG. 8(a1) shows an ON voltage (3 V) of the address electrode. FIG. 8(a2) shows an OFF voltage (1.5 V) of the column electrode. FIG. 8(a3) shows a voltage (1.5 V) applied across the liquid crystal by the ON voltage (3 V) of the address electrode and the OFF voltage (1.5 V) of the column electrode. FIG. 8(b1) shows an ON voltage (3 V) of the address electrode. FIG. 8(b2) shows an ON voltage (−1.5 V) of the column electrode. FIG. 8(b3) shows a voltage (4.5 V) applied across the liquid crystal by the ON voltage (3 V) of the address electrode and the ON voltage (−1.5 V) of the column electrode.

Figure 9:
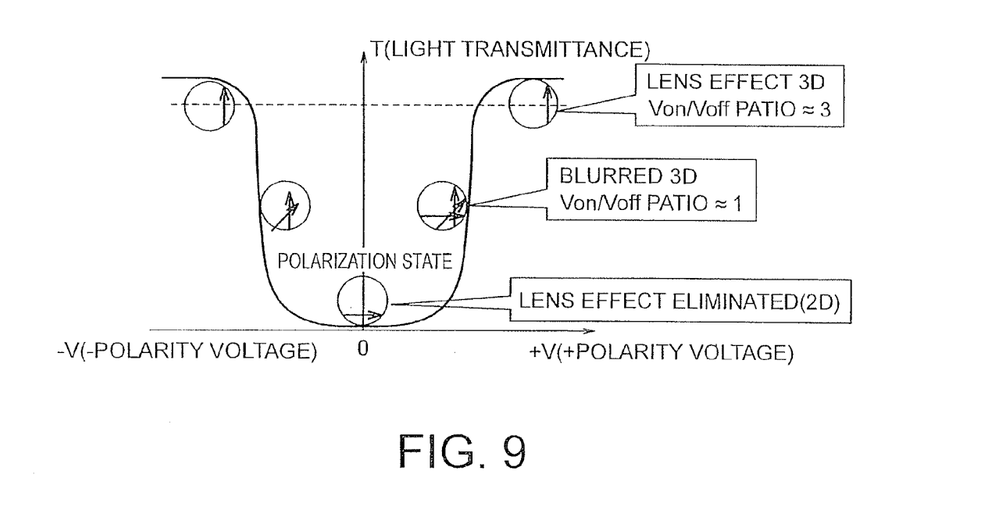
FIG. 9 is a diagram showing a typical V (voltage)–T (transmittance) curve.

FIG. 9 shows a typical V (voltage)–T (transmittance) curve. Constraint conditions concerning the polarization selection ratio will now be described. As an actually measured value which is nearly proportionate to the polarization selection ratio, there is a voltage dependent V (voltage)–T (transmittance) curve at a luminance obtained when TN liquid crystal interposed between transparent substrates is placed between sheet polarizers having polarization directions in the same direction. The rising state of the liquid crystal in the polarization switching cell can be known on the basis of the V (voltage)–T (transmittance) curve in the case of normally white. In other words, even if a voltage which is lower than a certain threshold voltage is applied under a condition that (strong anchoring) in which molecules do not move at a substrate interface at all exists when no voltage is applied, the orientation does not change at all. And if a voltage which is the threshold voltage or above is applied, the director of the liquid crystal begins to rise gradually. If almost all of the liquid crystal rises, the orientation does not change. In the V (voltage)–T (transmittance) curve, the light transmittance of the liquid crystal at the time when a maximum luminance is reached by applying a sufficiently great voltage is represented as Ttop. A voltage at which the luminance of transmitted light of the liquid crystal becomes 10% is denoted by V10 (at T=0.1 Ttop), and a voltage at which the luminance of transmitted light of the liquid crystal becomes 90% is denoted by V90 (at T=0.9 Ttop). If V<V10, then the polarization direction rotates by 90 degrees and consequently the transmittance becomes near 0 between sheet polarizers in the same direction, resulting in the 2D display mode. If V>V90, then the polarization direction does not rotate and consequently the transmittance becomes near 100% between sheet polarizers in the same direction, resulting in the 3D display mode.

Display degradation caused by a connecting wire of the column electrode will now be described. The display degradation means that display of a mode which is different from a mode to be displayed by a display area in the first column is conducted in an area of a connecting wire because a potential difference is caused between the near electrode and the far electrode. Incidentally, if the voltage of the near electrode is the same as the voltage of the far electrode, then display degradation does not occur because there is no potential difference with respect to the area of the connecting wire.

Figure 10:
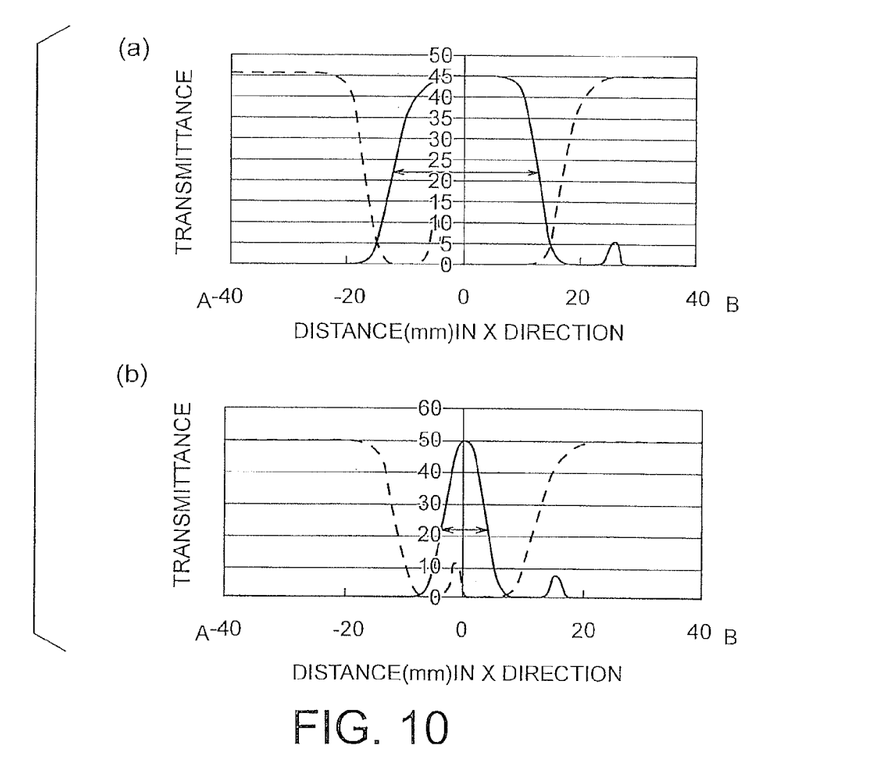
FIGS. 10(a) and 10(b) are diagrams showing a simulation result of liquid crystal director distribution of transmittance.

FIGS. 10(a) and 10(b) are diagrams showing a simulation result of liquid crystal director distribution of the transmittance. The x axis indicates the position along an AB section shown in FIG. 2. The position x=0 indicates a center of a connecting wire. The y axis indicates the liquid crystal transmittance. A solid line indicates a simulation result in the case where the ON voltage is applied to the near electrodes 19 and 21 and the OFF voltage is applied to the far electrode 22. A dashed line indicates a simulation result in the case where the OFF voltage is applied to the near electrodes 19 and 21 and the ON voltage is applied to the far electrode 22. The transmittance shown in FIG. 10 is transmittance obtained when the polarization switching cell is interposed between sheet polarizers having a polarization direction rotated by 90 degrees. If the incidence direction is the same in polarization direction as the illumination direction, then the 3D mode is brought about and the transmittance in the case where the polarization switching cell is interposed between the sheet polarizers becomes close to 0%. On the other hand, if the incidence direction rotates by 90 degrees in polarization direction as compared with the illumination direction, then the 2D mode is brought about and the transmittance in the case where the polarization switching cell is interposed between the sheet polarizers becomes close to 100%.

Display degradation in the area of the connecting wire will now be described with reference to FIG. 10(a). It is supposed that a space between the near electrode 19 and the near electrode 21 is 40 μm and a connecting wire of the far electrode passing through the space is 20 μm. In the case of a solid line, in the area in the X direction of the connecting wire, the 2D display exists between 3D displays. In the case of a dashed line, 3D display exists between 2D displays. Comparing the solid line with the dashed line, 2D display is brought about only in an area of 20 μm which is the width of the connecting wire in the case of the solid line, and 3D display is brought about in other areas. In the case of the dashed line, however, 3D display is brought about not only in the area of 20 μm which is the width of the connecting wire, but also in an area of 40 μm which is the space between the near electrode 19 and the near electrode 21, and 2D display is brought about in other areas. It is appreciated that the appearance range of a different display mode caused by leak of the voltage on the connecting wire is wider under the condition of the dashed line.

A method for reducing the display degradation in the area of the connecting wire will now be described with reference to FIG. 10(b). It is supposed that a space between the near electrode 19 and the near electrode 21 is 30 μm and the width of the connecting wire of the far electrode passing through the space is 10 μm. In the case of a solid line, in the area of the connecting wire, the 2D display exists between 3D displays in the same way as FIG. 10(a). In the case of a dashed line, 3D display exists between 2D displays. Comparing the solid line with the dashed line, 2D display is brought about only in an area of 5 μm which is shorter than the width of the connecting wire in the case of the solid line, and 3D display is brought about in other areas. In general, it is thought that a mode difference of 5 μm cannot be visually recognized even if one pixel has a width in the range of 120 μm to 240 μm and the sub-pixel width of each color is one third thereof, i.e., in the range of 40 μm to 80 μm. On the basis of these facts, it is appreciated that the display degradation in the case where the OFF voltage is applied to the near electrodes 19 and 21 and the ON voltage is applied to the far electrode 22 can be reduced by making the space between the near electrode 19 and the near electrode 21 short and making the width of the connecting wire of the far electrode passing through the space short. In the case of the dashed line, 2D display is brought about not only in the area of 10 μm which is the width of the connecting wire, but also in an area of 30 μm which is the space between the near electrode 19 and the near electrode 21, and 3D display is brought about in other areas. It is appreciated that the appearance range of a different display mode caused by leak of the voltage on the connecting wire is wider under the condition of the dashed line and provision of only the present countermeasure is still insufficient.

The above-described condition corresponds to the case where the distance between the near electrodes is 30 μm which is greater than four times the thickness 5 μm of liquid crystal.

In other words, FIG. 10(a) is a diagram showing an example of the case where the distance between the near electrodes is greater than four times the thickness of liquid crystal. FIG. 10(b) shows a simulation result of the liquid crystal transmittance obtained when the distance between the near electrodes is four times the thickness of the liquid crystal. In the case where the ON voltage is applied to the near electrodes 19 and 21 and the OFF voltage is applied to the far electrode 22 as represented by the solid line, it is appreciated that 3D display is brought about over the connecting wire area 221 as well by making the distance between the near electrodes shorter. In the case where the OFF voltage is applied to the near electrodes 19 and 21 and the ON voltage is applied to the far electrode 22, however, the area over the connecting wire 221 of the far electrode 22 still remains in the 2D display mode, resulting in display degradation.

Figure 11:
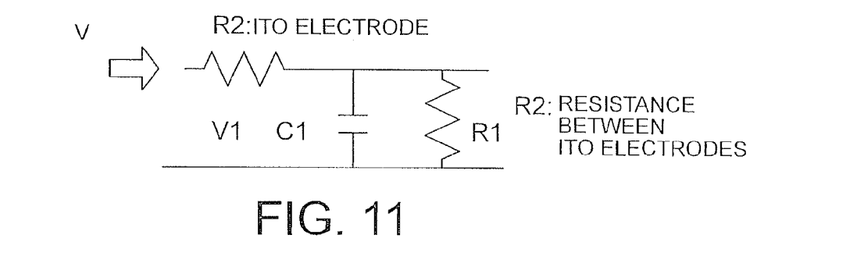
FIG. 11 shows an equivalent circuit of an ITO electrode.

Incidentally, for making the distance between the near electrodes equal to four times the thickness of the liquid crystal, the interconnection width of the connecting wire 221 of the far electrode (ITO) becomes as thin as approximately 10 μm in some cases. FIG. 11 shows an equivalent circuit of the ITO electrode. A time constant is calculated according to the following Equation.

$$e_c(t) = E\left(1 - \exp\left(-\frac{t}{\tau}\right)\right)$$

$$\tau = RC$$

TABLE 1

| Sheet resistance (Ω/□) of ITO | 100 | 100 | 100 | 100 |
|---|---|---|---|---|
| R (resistance at interconnection length described below) | $2.00 \times 10^3$ | $2.00 \times 10^4$ | $4.00 \times 10^5$ | $1.20 \times 10^6$ |
| C (supposing that interconnection width is 6 mm) | $4.33 \times 10^{-9}$ | $4.33 \times 10^{-9}$ | $4.33 \times 10^{-9}$ | $1.16 \times 10^{-8}$ |
| Interconnection width of connecting wire | 0.006 | 0.0006 | 0.00003 | 0.00001 |
| Thickness of liquid crystal | $5.00 \times 10^{-6}$ | $5.00 \times 10^{-6}$ | $5.00 \times 10^{-6}$ | $5.00 \times 10^{-6}$ |
| Dielectric constant | 3.400 | 3.400 | 3.400 | 5.450 |
| Interconnection length (m) | 0.12 | 0.12 | 0.12 | 0.12 |
| $\epsilon_0$ | $8.854 \times 10^{-12}$ | $8.854 \times 10^{-12}$ | $8.854 \times 10^{-12}$ | $8.854 \times 10^{-12}$ |
| $\tau$ | $8.67 \times 10^{-6}$ | $8.67 \times 10^{-5}$ | $1.73 \times 10^{-3}$ | $1.39 \times 10^{-2}$ |
| $\tau$ (ms) | 0.0086698 | 0.866984 | 1.7339674 | 13.897238 |
| Interconnection width (μm) | 6000 | 600 | 30 | 10 |

As shown in TABLE 1, the rising time becomes 13 ms in the case where the interconnection width is 10 μm. Although it is shorter than 16.6 ms in the case of 60 Hz drive, it is nearly equivalent. In the case of a changeover cell, a response time which is one frame or less is sufficient unlike moving picture display. Therefore, the distance between the near electrodes can be made equal to four times the thickness of the liquid crystal.

Figure 12:
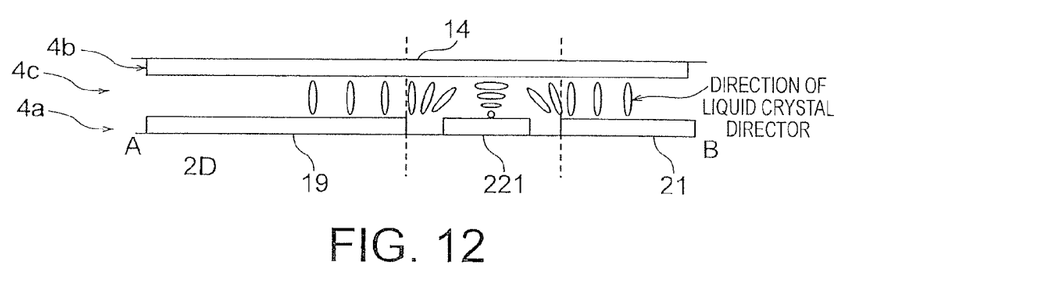
FIG. 12 is a schematic diagram of a section obtained by cutting the polarization switching cell shown in FIG. 1 along an A-B section.
Figure 13:
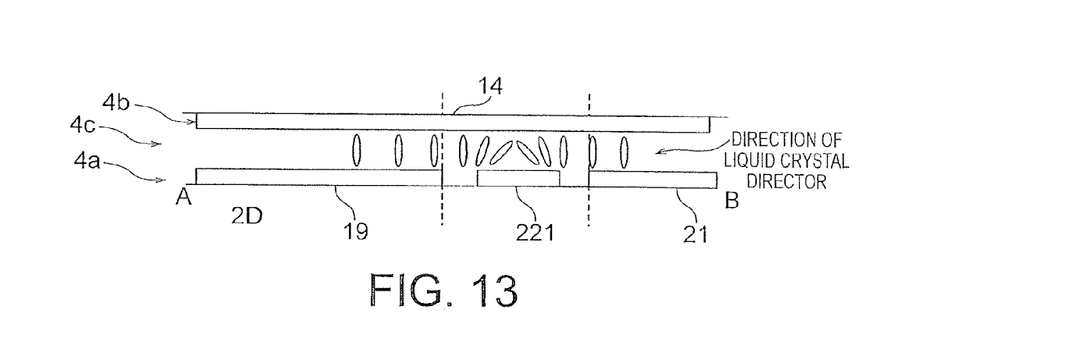
FIG. 13 is a schematic diagram of a section obtained by cutting the polarization switching cell shown in FIG. 1 along an A-B section.
Figure 14:
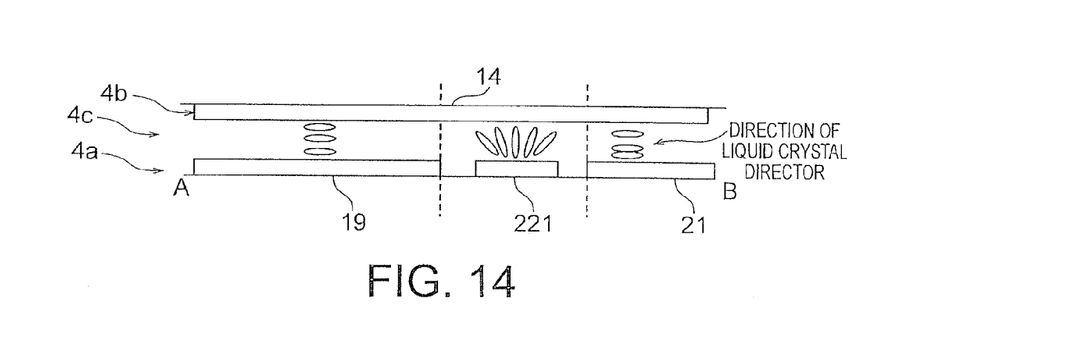
FIG. 14 is a schematic diagram of a section obtained by cutting the polarization switching cell shown in FIG. 1 along an A-B section.

FIGS. 12, 13 and 14 are schematic diagrams of sections obtained by cutting the polarization switching cell 4 shown in FIG. 1 along an A-B section shown in FIG. 2.

FIG. 12 shows an example in which the ON voltage is applied to the near electrodes 19 and 21 and the OFF voltage is applied to the far electrode 22. The ON voltage is applied to the address electrode 14. If the OFF voltage of the far electrode 22 is 0 V, then the potential difference does not change from V0 even in the area of the connecting wire 221 and consequently the display mode in the area of the connecting wire 221 becomes 2D. FIG. 13 is a schematic diagram of a section obtained by cutting the polarization switching cell 4 shown in FIG. 1 along the A-B section in the case where the distance between the near electrodes 20 and 21 is made close to four times the thickness of the liquid crystal 4c in order to solve the display degradation.

FIG. 13 shows an example in which the ON voltage is applied to the near electrodes 20 and 21 and the OFF voltage is applied to the fan electrode 22. The ON voltage is applied to the address electrode 14. If the distance between the near electrodes 20 and 21 is made short, liquid crystal rises because of leak electric field from the near electrodes 20 and 21 even in the area of the director connecting wire 221 of the liquid crystal as shown in FIG. 13. Since the polarization direction does not rotate by 90 degrees either, 2D display mode is not brought about and the display degradation can be eliminated.

FIG. 14 shows an example in which the OFF voltage is applied to the near electrodes 20 and 21 and the ON voltage is applied to the far electrode 22. The OFF voltage is applied to the address electrode 14. In this case, 2D display is brought about over the near electrodes 20 and 21, and 3D display is brought about in the area of the connecting wire 221. This is perceived as display degradation.

Figure 15:
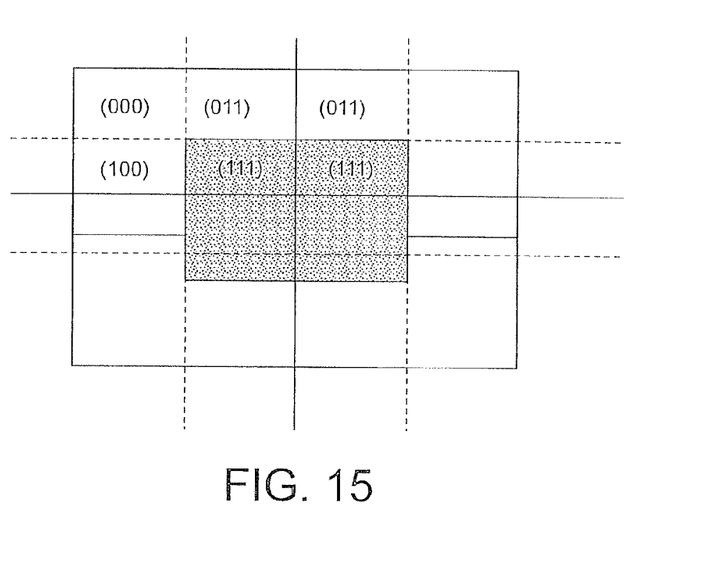
FIG. 15 is a diagram showing an example of a 3D display window.
Figure 16:
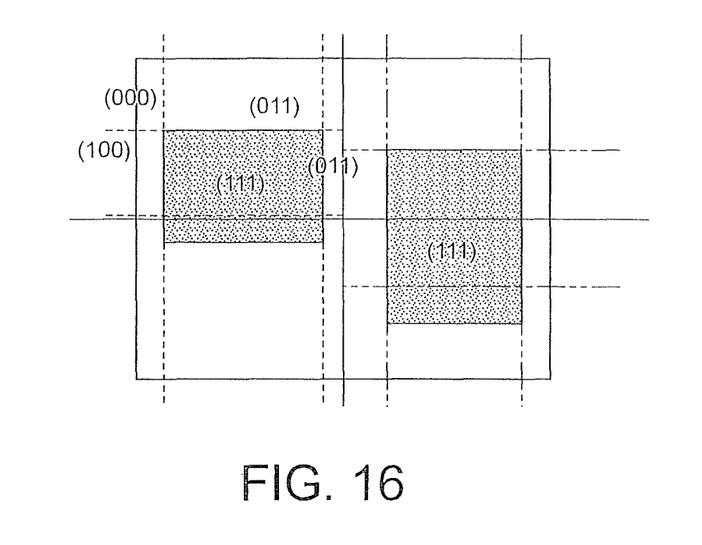
FIG. 16 is a diagram showing an example of a 3D display window.

FIG. 15 shows voltage combinations in the case where there is one 3D window. A shaded area indicates a 3D display window. In this case, there is no combination (1, 1, −1) which causes display degradation, and consequently display degradation does not take place. FIG. 16 shows voltage combinations in the case where there are two 3D display windows on the left and right sides. In this case, there is no combination (1, 1, −1) which causes display degradation, and consequently display degradation does not take place.

As appreciated from FIG. 7, the 3D display mode is brought about when the address voltage and the column voltage are always applied in opposite directions. In other words, only when (address electrode, column electrode)=(1, −1), the 3D display mode is brought about. Also in the case where the address electrode and the column electrode are inverted as represented by (address electrode, column electrode)=(−1, 1), the 3D display mode can be brought about.

The case where display degradation as shown in FIG. 14 is caused by the connecting wire according to applying the column voltage in A and C areas and B and D areas shown in FIG. 4 will now be described.

With respect to the A and C areas, Near function is defined as Near (a voltage of an address electrode in the first row, a column voltage of a near electrode, a column voltage of a far electrode).

With respect to the B and D areas, Far function is defined as Far (a voltage of an address electrode in the second row, a column voltage of a far electrode).

Here, the ON voltage of the address electrode is represented by 1, the OFF voltage of the address electrode is represented by 0, the ON voltage of the column electrode is represented by −1, and the OFF voltage of the column electrode is represented by 1.

Case 1: Near (1, −1, 1), Far (1, −1) 3D display in the near electrode areas and 2D display for the connecting wire between the near electrode areas, Case 2: Near (1, −1, −1), Far (1, −1) 3D display in the near electrode areas and 3D display for the connecting wire between the near electrode areas, and Case 3: Near (1, 1, 1), Far (1, 1) 2D display in the near electrode areas and 2D display for the connecting wire between the near electrode areas.

Display degradation in these combinations is eliminated as described earlier.

However, display degradation is not eliminated in the following case.

Case 4 degradation: Near (1, 1, −1), Far (1, −1) 2D display in the near electrode areas and 3D display for the connecting wire between the near electrode areas.

Therefore, a third address voltage obtained by inverting the positive-negative polarity of the first address voltage is applied to the address electrodes 15 and 17 which are the far electrodes. In other words, case 4 normal: Near (1, 1, 1), Far (−1, 1) 2D display in the near electrode areas and 3D display for the connecting wire between the near electrode areas, the voltage at the connecting wire of the far electrode becomes equal to the voltage at the connecting wire of the adjacent near electrode, and consequently the display degradation is eliminated.

Figure 17:
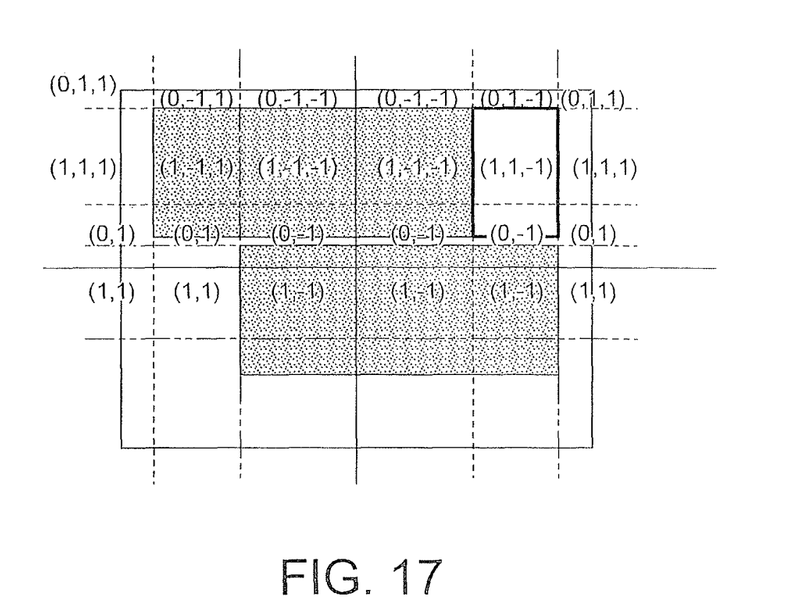
FIG. 17 is a diagram showing an example of a 3D display window.

In an area surrounded by a rectangle in FIG. 17, 3D display of the connecting wire in 2D display is perceived, resulting in display degradation.

Figure 19:
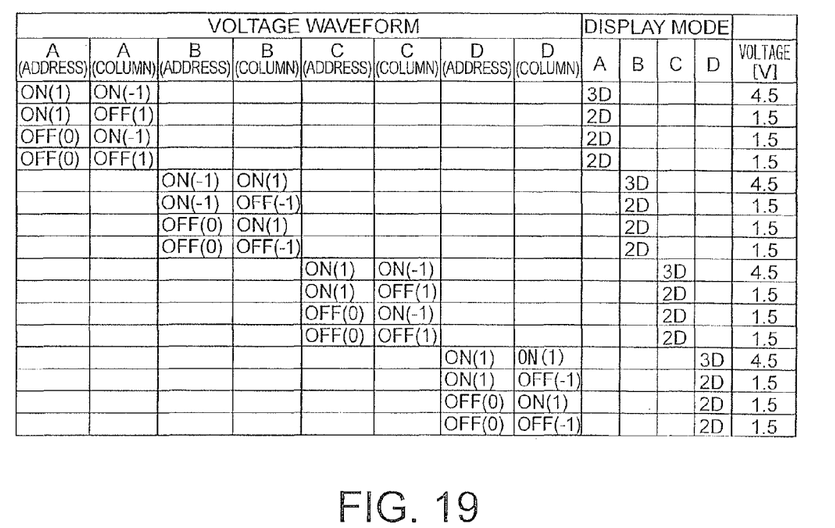
FIG. 19 is a diagram showing voltage display, display modes, and voltages applied to the polarization switching cell.

FIG. 19 shows voltage display, display modes, and voltages applied to the polarization switching cell when the address voltage and the column electrode of the far electrodes are inverted.

Figure 18:
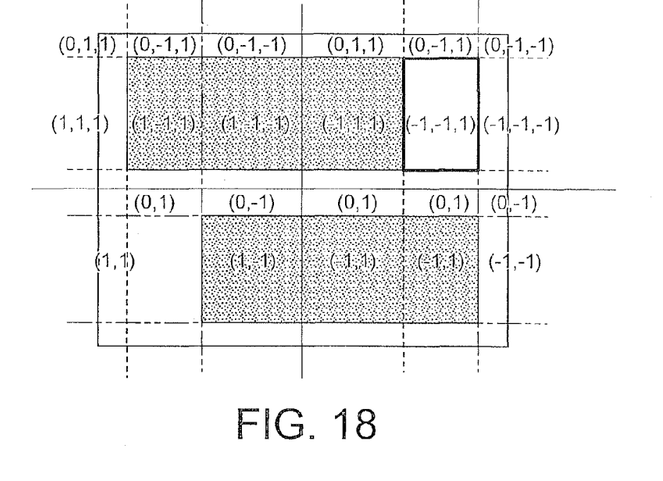
FIG. 18 is a diagram showing an example of a 3D display window.

In an area surrounded by a rectangle in FIG. 18, 3D display of the connecting wire in 2D display is not perceived by inverting address interconnections of the far electrodes, and the display degradation is prevented.

From the foregoing description, a decision is made whether to invert the ON voltage of the address electrode by comparing the width of the 3D display window on the top side with that on the bottom side. If the width on the top side is greater, the address electrode should not be inverted. If the width on the bottom side is greater, the address electrode should be inverted. Furthermore, it is necessary to invert the column electrode as well in response to inversion of the address electrode. This holds true in the case where there are at least three 3D display windows as well.

The case where 3D display is conducted partially by using high definition 2D with the lens effect canceled as the background has been described. To the contrary, however, also in the case where 2D display is conducted partially by using 3D display as the background, it can be made possible to display four 3D display windows without display degradation in a state in which the ratio of ON/OFF voltage is close to 3, in the same way.

In the double refraction 2D/3D changeover display, four 3D windows can be changed over independently without display degradation by changing the inverted region of the drive voltage according to the position of the 3D display window and making the space between electrodes equal to four times of the thickness of liquid crystal or less. In addition, if a fault such as engagement with dust or the like has occurred, the degraded area can be limited in area to a quarter.

As mentioned above, according to embodiments, it is possible to reduce display degradation caused by a leak of a voltage from a connecting wire which passes through between interconnections for applying a voltage between opposed electrodes, in a display apparatus capable of partially changing over between a two-dimensional image and a three-dimensional image.

While certain embodiments have been described, these embodiments have been presented by way of example only, and are not intended to limit the scope of the inventions. Indeed, the novel methods and systems described herein can be embodied in a variety of other forms; furthermore, various omissions, substitutions and changes in the form of the methods and systems described herein can be made without departing from the spirit of the inventions. The accompanying claims and their equivalents are intended to cover such forms or modifications as would fall within the scope and spirit of the inventions.

The invention claimed is:
1. A display apparatus comprising:
a display device;
a switching unit provided opposed to the display device and configured to control a polarization direction of a light ray illuminated from the display device,
the switching unit comprising
a first substrate having a plurality of address electrodes arranged in a first direction, each address electrode classified into a first row or a second row in accordance with a distance from a first side parallel to the first direction,
a second substrate having a plurality of column electrodes arranged in a second direction nearly perpendicular to the first direction, each column electrode having a connecting wire extending to a first side and classified into a near electrode or a far electrode in accordance with a distance from the first side,
liquid crystal interposed between the first substrate and the second substrate; and
a control unit configured to supply voltage between the address electrode and the column electrode,
(a) if a first area corresponding to the first row includes a 3D mode area, the control unit applying a first address voltage to the address electrode in the first row, and applying a first column voltage to the near electrode in the 3D mode area, and (b) if a second area corresponding to the address electrode in the second row includes the 3D mode area and a third area included in the first area corresponding to the connecting wire includes the 2D mode area, the control unit applying a third address voltage inverse of the first address to the address electrode in the second row, and applying a third column voltage inverse of the first column voltage to the far electrode in the 3D mode area.

2. The apparatus according to claim 1, wherein (c) if the first area includes the 2D mode area, the control unit applies the first address voltage to the address electrode in the first row, and applies a second column voltage to the near electrode in the 2D mode area, and (d) if the second area includes the 3D mode area and the 2D mode area and the third area included in the first area corresponding to the connecting wire includes the 2D mode area, the control unit applies the third address voltage inverse of the first address voltage to the address electrode in the second row, and applies a forth column voltage inverse of the second column voltage to the far electrode in the 2D mode area.

3. The apparatus according to claim 1, wherein if the first area does not include the 3D mode area, the control unit applies a second address voltage to the address electrode in the first row.

4. The apparatus according to claim 1, wherein each of the first address voltage and the first column voltage is lower that a threshold voltage of the liquid crystal, and a voltage between the address electrode and the column electrode is larger than the threshold voltage of the liquid crystal when the first address voltage and the first column voltage are applied simultaneously.

5. The apparatus according to claim 1, wherein a distance between the near electrodes is shorter than a distance which is four times a thickness of the switching unit.

6. The apparatus according to claim 5, wherein
the first substrate comprises the address electrode in the first row numbering two and the address electrode in the second row numbering two,
the four address electrodes having address connecting wires which extend as far as a second side of the first substrate nearly perpendicular to the first side and which are supplied with voltages, and
black matrixes are disposed on the address connecting wires.

7. The apparatus according to claim 1, further comprising:
an optical unit provided on an opposite side of the polarization switching cell polarization switching cell from the display device to distribute light rays from the pixels obtained via the polarization switching cell to predetermined angles.

8. A drive method for driving a stereoscopic display apparatus, the stereoscopic display apparatus comprising:
a display device having a plurality of pixels arranged on a display face;
a polarization switching cell provided in front of the display device, the polarization switching cell comprising a first substrate having a plurality of transparent address electrodes arranged in first direction, a second substrate having a plurality of transparent column electrodes arranged in a direction nearly perpendicular to a direction in which the address electrodes are arranged, and liquid crystal interposed between the first substrate and the second substrate, a polarization direction of a light ray illuminated from the display device being varied according to a voltage applied between the first and second substrates;
an optical unit provided on an opposite side of the polarization switching cell from the display device to distribute light rays from the pixels obtained via the polarization switching cell to predetermined angles,
the column electrodes having connecting wires which extend as far as a first side extending on the second substrate in a direction of arrangement of the address electrodes and which are supplied with voltages, the column electrodes comprising near electrodes disposed near the first side and far electrodes disposed relatively farther from the first side than the near electrodes,
the address electrodes being arranged on the first substrate to have a first row disposed near the first side and a second column relatively farther from the first side than the first row in nearly first direction,
the stereoscopic display apparatus being capable of changing over between a three-dimensional image and a two-dimensional image and displaying,
(a) if there is an area to be subject to stereoscopic display in areas corresponding to the address electrodes in the first row, the drive method applying a first address voltage to the address electrodes in the first row, applying a first row voltage to the near electrode corresponding to the area to be subject to stereoscopic display, and applying a second column voltage to the near electrode corresponding to an area not to be subject to stereoscopic display,
(b) if there is not an area to be subject to stereoscopic display in areas corresponding to the address electrodes in the first row, the drive method applying a second address voltage to the address electrodes in the first row, and (c) if areas corresponding to the address electrodes in the second column have an area to be subject to stereoscopic display and an area not to be subject to stereoscopic display and an area of the connecting wire of the far electrode corresponding to the area to be subject to stereoscopic display in the second column is included in the area not to be subject to stereoscopic display in the first column, the drive method applying a third address voltage obtained by inverting the first address voltage in positive-negative polarity to the address electrodes in the second column, applying a third column voltage obtained by inverting the first column voltage in positive-negative polarity to the far electrode corresponding to the area to be subject to stereoscopic display, and applying a fourth column voltage obtained by inverting the second column voltage in positive-negative polarity to the far electrode corresponding to the area not to be subject to stereoscopic display.

9. A control device for controlling a display apparatus, the display apparatus comprising: a display device; a switching unit provided opposed to the display device and configured to control a polarization direction of a light ray illuminated from the display device, the switching unit comprising a first substrate having a plurality of address electrodes arranged in a first direction, each address electrode classified into a first row or a second row in accordance with a distance from a first side parallel to the first direction, a second substrate having a plurality of column electrodes arranged in a second direction nearly perpendicular to the first direction, each column electrode having a connecting wire extending to a first side and classified into a near electrode or a far electrode in accordance with a distance from the first side, and liquid crystal interposed between the first substrate and the second substrate, the control device configured to supply voltage between the address electrode and the column electrode, (a) if a first area corresponding to the first row includes a 3D mode area, the control device applying a first address voltage to the address electrode in the first row, and applying a first column voltage to the near electrode in the 3D mode area, and (b) if a second area corresponding to the address electrode in the second row includes the 3D mode area and a third area included in the first area corresponding to the connecting wire includes the 2D mode area, the control device applying a third address voltage inverse of the first address to the address electrode in the second row, and applying a third column voltage inverse of the first column voltage to the far electrode in the 3D mode area.

10. The device according to claim 9, wherein (c) if the first area includes the 2D mode area, the control device applies the first address voltage to the address electrode in the first row, and applies a second column voltage to the near electrode in the 2D mode area, and (d) if the second area includes the 3D mode area and the 2D mode area and the third area included in the first area corresponding to the connecting wire includes the 2D mode area, the control device applies the third address voltage inverse of the first address voltage to the address electrode in the second row, and applies a forth column voltage inverse of the second column voltage to the far electrode in the 2D mode area.

11. The device according to claim 9, wherein if the first area does not include the 3D mode area, the control device applies a second address voltage to the address electrode in the first row.

12. The device according to claim 9, wherein each of the first address voltage and the first column voltage is lower that a threshold voltage of the liquid crystal, and a voltage between the address electrode and the column electrode is larger than the threshold voltage of the liquid crystal when the first address voltage and the first column voltage are applied simultaneously.

13. The device according to claim 9, wherein a distance between the near electrodes is shorter than a distance which is four times a thickness of the switching unit.

14. The device according to claim 13, wherein
the first substrate comprises the address electrode in the first row numbering two and the address electrode in the second row numbering two,
the four address electrodes having address connecting wires which extend as far as a second side of the first substrate nearly perpendicular to the first side and which are supplied with voltages, and
black matrixes are disposed on the address connecting wires.

15. The device according to claim 9, further comprising: an optical unit provided on an opposite side of the polarization switching cell polarization switching cell from the display device to distribute light rays from the pixels obtained via the polarization switching cell to predetermined angles.

* * * * *